Patented Feb. 8, 1944

2,341,175

UNITED STATES PATENT OFFICE 2,341,175

INSOLUBLE POLYMERS DERIVED FROM STYRENE

Edgar C. Britton, Midland, Mich., Harry Borden Marshall, Toronto, Ontario, Canada, and Walter J. Le Fevre, Midland, Mich., assignors to The Dow Chemical Company, Midland, Mich., a corporation of Michigan No Drawing. Application March 15, 1940, Serial No. 324,230

1 Claim. (Cl. 260—91)

This invention relates to a new type of polymeric product derived from styrene, and in particular concerns polymers which are substantially insoluble and non-swelling in common organic solvents.

It is known that styrene may be polymerized in the presence of a variety of unsaturated organic compounds to form co-polymeric products which may be completely soluble in the same solvents as polystyrene or which may be substantially insoluble but capable of swelling in such solvents. All of such products are described as hard, tough or brittle, glass-like resins which closely resemble polystyrene in appearance. We have now found that under certain conditions styrene may be polymerized in the presence of other unsaturated compounds, particularly organic esters containing two or more

groups, to form new thermoplastic resinous products which are characterized by being substantially insoluble and non-swelling in such organic solvents as acetone, ethanol, benzene, toluene, cyclohexane, dioxane, carbon tetrachloride, ethyl acetate, ethyl benzene, petroleum ether, etc. These products are obtained in the form of friable, white, porous masses resembling bleached cellulose in appearance, and accordingly, are clearly differentiated from the hard, tough, glass-like insoluble styrene co-polymers known heretofore. Because of their characteristic appearance and feel these products have become known as "popcorn" polymers. They appear to be true co-polymers of styrene and for convenience are hereinafter referred to as such, although it is possible that they may be new polymers of styrene itself having a unique structure brought about through catalytic influence of the co-polymerizing agents. The invention is not limited, however, by any theory herein proposed as to the structure of the new products.

Although the new co-polymers are initially obtained as opaque, white friable materials, they may be molded in accordance with customary procedure to obtain clear, transparent, glass-like moldings which are substantially insoluble and non-swelling and which in many cases show higher strength and better resistance towards distortion by heat than molded polystyrene. The friability of the new co-polymers and the ease with which they may be ground to fine powders make them exceptionally well suited to be employed as molding powders in the manufacture of molded objects. Many of the new products also have good dielectric properties and are adapted for use as or in electrical insulators.

The neutral unsaturated esters containing at least two

groups which are preferably employed as the co-polymerizing agents in preparing the new co-polymers may be divided into three groups: (1) the neutral unsaturated mono- and poly-carboxylic acid esters of unsaturated alcohols, e. g., allyl cinnamate, diallyl maleate, methallyl cinnamate, 2-chloroallyl crotonate, allyl acrylate, etc.; (2) the neutral saturated poly-carboxylic esters of unsaturated alcohols, e. g., diallyl oxalate, dicrotyl phthalate, di-(2-chloroallyl) adipate, etc.; and (3) the neutral esters of unsaturated acids with polyhydric alcohols, e. g., ethylene dicrotonate, the di-cinnamate of 1.4-dioxanediol-2.3, etc. Such esters may usually be prepared by any of the well-known methods for the production of esters from alcohols and acids. It is to be understood, however, that while the unsaturated esters of the above type form a preferred group of co-polymerizing agents, the new co-polymers may also be prepared from styrene and a variety of other unsaturated compounds, such as divinyl benzene and its derivatives, butadiene, isoprene, etc.

The new co-polymers are prepared by mixing a minor proportion of the co-polymerizing agent with styrene or partially polymerized styrene and thereafter polymerizing the mixture by heating at a temperature below about 110° C., preferably at 50°–80° C. When polymerizing temperatures above about 110° C. are employed, the product obtained consists entirely, or at best almost entirely, of the transparent glass-like type of co-polymer which swells in benzene and other aromatic hydrocarbon solvents. During the polymerization of the mixture of styrene and the co-polymerizing agent, the substantially insoluble and non-swelling product is gradually formed within the mixture as a friable, white, porous mass which has the appearance of a mass of cotton linters. At the same time, there is frequently formed more or less of the glass-like, swelling type of co-polymer, so that when the polymerization is complete, the entire polymerized mass in some instances appears as a transparent, glass-like resin having the friable white material suspended therein. The two types of material may be separated by methods hereinafter described.

The proportion in which the new co-polymers are formed when prepared as described above depends upon a number of factors, viz., the purity of the styrene and the co-polymerizing agent, the particular co-polymerizing agent and the proportion in which it is employed, the polymerizing temperature, and the time of polymerization.

The new products are obtained in highest yield when both the styrene and co-polymerizing agent contain no impurities which tend to inhibit polymerization. For example, the use of styrene which contains even small amounts of its normally incident impurity, phenyl acetylene, results in low yields of the desired type of co-polymer and the product obtained consists almost entirely of the glass-like swelling type of co-polymer. The yield of the non-swelling type of co-polymer also varies with the particular co-polymerizing agent, and, as hereinbefore stated, a preferred class of co-polymerizing agents includes neutral unsaturated esters containing at least two

groups. Among such esters, we have found that the allyl, 2-chloroallyl, and methallyl esters of relatively low molecular weight acids, e. g., diallyl maleate, allyl cinnamate, di-(2-chloroallyl) oxalate, dimethallyl fumarate, etc., frequently produce the desired product in almost quantitative yield, whereas more complex esters of higher molecular weight tend to give a somewhat larger proportion of the glass-like product.

A small yield of the substantially insoluble and non-swelling type of co-polymer may frequently be obtained by polymerizing styrene in the presence of a mere trace of one of the unsaturated co-polymerizing agents, but the yield is higher when an appreciable proportion of the co-polymerizing agent is used. In practice, we usually employ between about 0.01 and about 0.25 part by weight of the co-polymerizing agent per part of styrene, although other proportions may be used if desired. Regardless of the proportions in which the co-polymerizing agent is employed, however, the amount of such agent which actually enters into chemical combination with the styrene is very small, since it is possible to remove a large proportion of uncombined co-polymerizing agent from the co-polymer by subjecting the latter to extraction with a suitable solvent.

Polymerization to form a styrene co-polymer of the present type is usually complete in from three to four days when carried out at temperatures between about 80° C. and about 100° C., whereas a somewhat longer time is required when lower polymerization temperatures are employed. To insure complete polymerization with highest yield of the desired product, the polymerization is usually carried out by heating the mixture of styrene and co-polymerizing agent in an oil bath or oven at a temperature of about 80° C. for six or seven days.

The polymerization product obtained frequently consists of a mixture of the swelling and non-swelling types of co-polymers and although such mixed product may be employed directly in the preparation of molding powders, it is usually desirable to separate the two types of product. Such separation may be effected by swelling the glass-like material to a thin gel in a large amount of benzene or other swelling solvent and decanting or straining the gel from the non-swelling material. The latter may then be washed with the solvent, dried, and obtained as a dry, white, friable material, resembling bleached wood-pulp in appearance. When ground to a fine powder, this material has the appearance of powdered sugar or starch and has a peculiar elastic feel when rubbed between the fingers. The two types of co-polymers may also be separated by a differential grinding process, whereby advantage is taken of the ease with which the non-swelling type of product may be ground.

The following examples illustrate a number of ways in which the principle of the invention has been applied but are not to be construed as limiting the same.

*Example 1*

A mixture of 100 parts by weight of styrene and 20 parts by weight of allyl cinnamate was polymerized by heating at 70°–80° C. for six days. During the polymerization there formed with the mixture an opaque white material resembling a mass of cotton linters. The completely polymerized product was a fluffy, white mass having a small amount of a glass-like resin interspersed therethrough. The mixed product was crushed and passed through a sieve, whereby the two types of co-polymer were separated, since the opaque, white material is much more readily crushed to a fine powder than is the glass-like co-polymer. The opaque, white co-polymer was insoluble and non-swelling in acetone, alcohol, benzene, toluene, dioxane, carbon tetrachloride, etc. A molded test specimen prepared by molding the opaque material under pressure at 170° C. had a tensile strength of approximately 4800 pounds per square inch, a Shore hardness of 80, and a heat distortion value of 89° C.

*Example 2*

A mixture of 100 parts by weight of styrene and 10 parts by weight of diallyl oxalate was polymerized by heating at 70° C. for 8 days. The polymeric product consisted almost entirely of a swollen white mass similar to the opaque, white product obtained in Example 1. The polymerized mass was placed in benzene, whereby the small amount of glass-like polymer which was present swelled to a thin gel. The gel was decanted from the opaque, white, non-swollen material, and the latter was washed with acetone, dried, and ground. The finely ground material was insoluble and non-swelling in benzene and similar solvents, and was suitable to be employed as a molding powder.

*Example 3*

10 parts of styrene and 1 part of 2-chloroallyl furoate were co-polymerized by heating at approximately 80° C. for 64 hours to obtain an almost quantitative yield of the opaque, white type of co-polymer which is substantially insoluble and non-swelling. The product was ground, extracted with acetone to remove any unreacted 2-chloroallyl furoate, and dried in a vacuum oven. A molded specimen of the co-polymer was a clear, glass-like resin having a tensile strength of about 7500 pounds per square inch, a Shore Scleroscope hardness of 86, and a heat distortion value of about 89° C.

Example 4

A mixture of 10 parts of styrene and 1 part of di-(2-chloroallyl) succinate was polymerized by heating at approximately 100° C. for seven days. The polymerized product contained about 90 per cent by volume of the hard, clear type of co-polymer and about 10 per cent of the insoluble, non-swelling, opaque material.

Example 5

A mixture of 10 parts of ethylene dicinnamate and 50 parts of monomeric styrene was polymerized by heating at a temperature of 80° C. for seven days. The polymerized mass contained about 75 per cent by volume of the opaque, white, non-swelling type of co-polymer, the remainder being a glass-like resin with a faint yellow tinge. The glass-like material swelled when contacted with benzene.

Example 6

50 parts of styrene was so-polymerized with 5 parts of 2-chloroallyl crotonate by heating at 80° C. for seven days. The polymeric product consisted of about 35 per cent of non-swelling polymer and about 65 per cent of a glass-like polymer which could be swelled to an insoluble gel in benzene.

Example 7

A 10 per cent yield of opaque, white, non-swelling co-polymer was obtained by polymerizing 50 parts of styrene in the presence of 5 parts of di-(2-chloroallyl) phthalate. The opaque, white material was separated from the glass-like product by causing the latter to swell to a thin gel in benzene and decanting the gel from the non-swelling material.

Example 8

A mixture of 5 parts of diallyl maleate and 50 parts of styrene which analyzed 98.3 per cent pure was heated at 80° C. for 168 hours. The polymerized product consisted of about 50 per cent of the opaque, white, non-swelling co-polymer. This same experiment was repeated using styrene of 99.8 per cent purity, in which case 90 per cent of the product was the opaque non-swelling type of co-polymer.

Example 9

A mixture of 50 parts of styrene and 3 parts of the dicinnamate of 1.4-dioxanediol-2.3 was polymerized at 100° C. for 168 hours. About 5 per cent of the product was an opaque non-swelling co-polymer, the remainder being a glass-like type of co-polymer which was capable of swelling. The yield of non-swelling co-polymer may be increased by increasing the proportion of co-polymerizing agent and by carrying out the polymerization at a lower temperature.

Example 10

A product containing 75 per cent by weight of an opaque, white, non-swelling co-polymer was obtained by co-polymerizing 50 parts of styrene with 5 parts of diallyl fumarate at a temperature of 80° C. for 168 hours. The non-swelling product was separated from the glass-like co-polymer and was washed, dried, and ground to form a molding powder. A molded test specimen which had been molded at 150° C. had a tensile strength of about 3700 pounds per square inch, a heat distortion value of 78° C., and a Shore hardness of 80.

Example 11

A mixture of 50 parts of styrene and 5 parts of diallyl maleate was heated at 80° C. for 168 hours. The polymerized product consisted of a swollen white mass having interspersed therethrough a small amount of glass-like material. The entire mass was ground, dried in a vacuum oven, and molded at 150° C. The molded test specimen had a tensile strength of 5100 pounds per square inch, an impact strength of 0.6 inch pound, a heat distortion value of 65° C., and a softening point of 149° C.

Example 12

100 parts of styrene was co-polymerized with 25 parts of methallyl cinnamate by heating at 100° C. for 94 hours. The product consisted of a flocculent white mass suspended in an equal volume of glass-like resin. The two types of material were separated by taking up in a large amount of benzene and decanting the thin gel which forms from the insoluble, non-swelling white material. When dried and ground, the latter product was a fine white powder resembling ground starch.

Example 13

The opaque, white, non-swelling co-polymer prepared by co-polymerizing 50 parts of styrene with 5 parts of diallyl maleate at 60° C. for 115 hours was continuously extracted with acetone in a Soxhlet extraction apparatus for 22 hours. The extracted co-polymer was then heated with alcoholic potash and the saponification number determined. From this value, it was calculated that the extracted co-polymer contained 0.6 per cent of diallyl maleate, probably held in chemical combination with the styrene.

Example 14

A mixture of 10 parts of monomeric styrene and 1 part of high quality tung oil was heated at 100° C. for 336 hours, whereby there was obtained a hard, glass-like mass having a small amount of the friable, white, insoluble and non-swelling type of co-polymer suspended therein.

Example 15

A mixture of 10 parts of styrene and 1 part of a 10 per cent solution of divinyl benzene in ethyl benzene was heated at 100° C. for 168 hours. The polymerized product consisted of approximately equal parts of a transparent glass-like product, which was substantially insoluble and capable of being but slightly swelled in benzene, and a friable white product which was substantially insoluble and non-swelling in benzene.

Example 16

A mixture of 10 parts of styrene and 1 part of butadiene (96 per cent pure) was heated at 80° C. for 168 hours. The polymerized product was a glass-like mass having a small amount of the opaque white type of co-polymer suspended therein.

This application is a continuation-in-part of our co-pending application Serial No. 217,224, filed July 2, 1938.

Other modes of applying the principle of our invention may be employed instead of those explained, change being made as regards the materials employed or the method herein disclosed, provided the products claimed in any of the following claims be obtained or the process stated by any of the following claims be employed.

We therefore particularly point out and distinctly claim as our invention:

A friable, solid polymer derived from styrene, said polymer being opaque, substantially colorless, and substantially insoluble and non-swelling in benzene.

EDGAR C. BRITTON.
WALTER J. LE FEVRE.
HARRY BORDEN MARSHALL.